United States Patent
Wang

(10) Patent No.: US 6,305,887 B1
(45) Date of Patent: Oct. 23, 2001

(54) STRUCTURE FOR MOUNTING MOTOR OF PLANING MACHINE

(75) Inventor: Chin-Tsang Wang, Taipei (TW)

(73) Assignee: Kufo Industries Corporation, Irwindale, CA (US)

( * ) Notice: Subject to any disclaimer, the term of this patent is extended or adjusted under 35 U.S.C. 154(b) by 0 days.

(21) Appl. No.: 09/450,428

(22) Filed: Nov. 30, 1999

(51) Int. Cl.⁷ ............................. B23C 1/06; F16H 7/14
(52) U.S. Cl. ................ 409/229; 144/135.2; 408/128; 474/77; 474/101; 474/114
(58) Field of Search ................ 144/135.2; 408/128; 409/228, 229; 474/113, 114, 115, 116, 117, 101, 77, 78, 79

(56) References Cited

U.S. PATENT DOCUMENTS

| | | | |
|---|---|---|---|
| 1,742,217 | * | 1/1930 | Renwick .................. 144/135.2 |
| 2,154,745 | * | 4/1939 | Hedgpeth .................. 408/128 |
| 2,400,448 | * | 5/1946 | Wellstein .................. 474/114 |
| 2,664,756 | * | 1/1954 | Fismer .................. 408/128 |
| 3,422,102 | * | 1/1969 | Baublys et al. .................. 474/114 |
| 3,523,470 | * | 8/1970 | Miller .................. 474/114 |
| 4,518,371 | * | 5/1985 | Hanson .................. 474/114 |
| 4,557,303 | * | 12/1985 | Gardner et al. .................. 144/135.2 |
| 5,205,331 | * | 4/1993 | Onsrud .................. 144/135.2 |

* cited by examiner

*Primary Examiner*—Daniel W. Howell
(74) *Attorney, Agent, or Firm*—A & J

(57) ABSTRACT

A structure for mounting a motor of a planing machine includes a hollow base, an axle casing fitted in said base and provided with a spindle for connecting with a planing cutter, a first pulley arranged under said spindle so that a belt connects said first pulley with a second pulley of a motor, wherein said axle casing is provided at a bottom with an extension having a circular hole and a curved groove subtending the center of the circular hole, a motor cover is installed on one end of a motor and has a pair of lugs in which is fitted an end of said extension, a pin is inserted into said lugs and said circular hole to form a pivot therebetween, and a locking handle is threadedly engaged with one of said lugs so that said motor is fastened on one side of said axle casing.

1 Claim, 6 Drawing Sheets

STRUCTURE FOR MOUNTING MOTOR OF PLANING MACHINE

BACKGROUND OF THE INVENTION

1. Field of the Invention

This invention is related to an improvement in the structure for mounting a motor of a planing machine.

2. Description of the Prior Art

Referring to FIG. 1, the conventional structure for mounting a motor of a planing machine includes a bracket 11 on which is pivotally installed a motor assembly 12. An elevating cylinder 14 is fitted to a control seat 13. The motor assembly 12 has an axle on which is arranged a first pulley 15 which is connected to a second pulley 18 on the spindle 17 of the planing machine. However, such a structure is unfit for practical use and suffers from the following drawbacks:

1. Difficult to assemble

The motor assembly 12 must be first mounted on the bracket 11 and then the elevated cylinder 14 is arranged on the control seat 13 thereby causing much inconvenience in assembly and requiring a lot of labor work. In addition, it is very difficult to arrange the first pulley 15 in alignment with the second pulley 18 thus making it unable to turn smoothly.

2. Unable to operate smoothly

When the spindle 17 is adjusted in the elevation angle, the belt 16 will be pulled to one side thereby making it unable to operate smoothly.

3. Inconvenience in use

The belt 16 cannot be adjusted in tension hence causing much inconvenience in use.

Therefore, it is an object of the present invention to provide an improvement in the structure for mounting a motor of a planing machine which can obviate and mitigate the above-mentioned drawbacks.

SUMMARY OF THE INVENTION

This invention is related to an improvement in the structure for mounting motor of a planing machine.

According to a preferred embodiment of the present invention, a structure for mounting a motor of a planing machine includes a hollow base, an axle casing fitted in said base and provided with a spindle for connecting with a planing cutter, a first pulley arranged under said spindle so that a belt connects said first pulley with a second pulley of a motor, wherein said axle casing is provided at a bottom with an extension having a circular hole and a curved groove subtending the center of the circular hole, a motor cover is installed on one end of a motor and has a pair of lugs in which is fitted an end of said extension, a pin is inserted into said lugs and said circular hole to form a pivot therebetween, and a locking handle is threadedly engaged with one of said lugs so that said motor is fastened on one side of said axle casing.

It is the primary object of the present invention to provide an improvement in the structure for mounting a motor of a planing machine which is simple in construction.

It is another object of the present invention to provide an improvement in the structure for mounting a motor of a planing machine which is easy to assemble.

It is still another object of the present invention to provide an improvement in the structure for mounting a motor of a planing machine which is facile to maintain.

It is still another object of the present invention to provide an improvement in the structure for mounting a motor of a planing machine which can be easily adjusted.

It is a further object of the present invention to provide an improvement in the structure for mounting a motor of a planing machine which is fit for practical use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
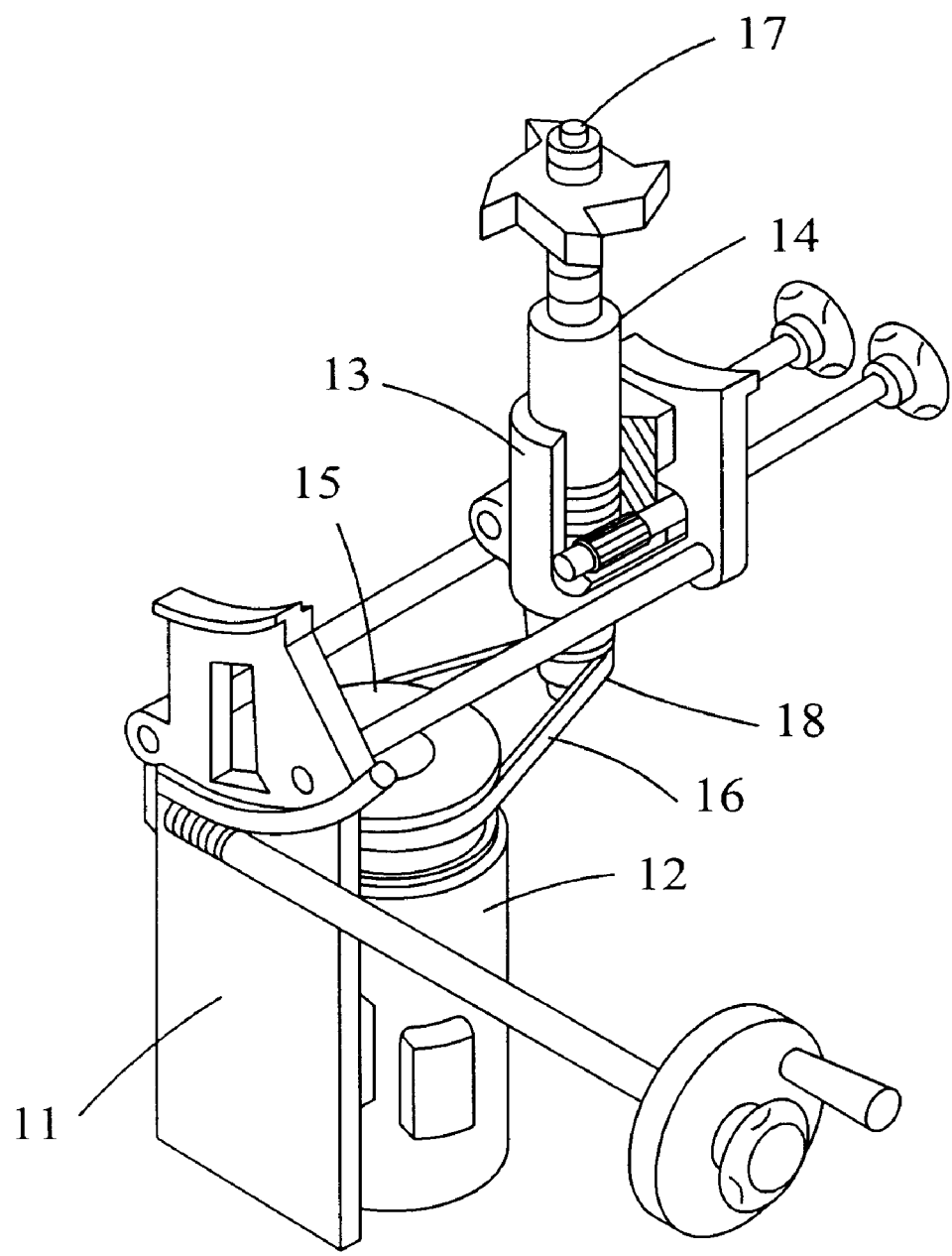
FIG. 1 is a perspective view of a prior art structure for mounting a motor of a planing machine.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
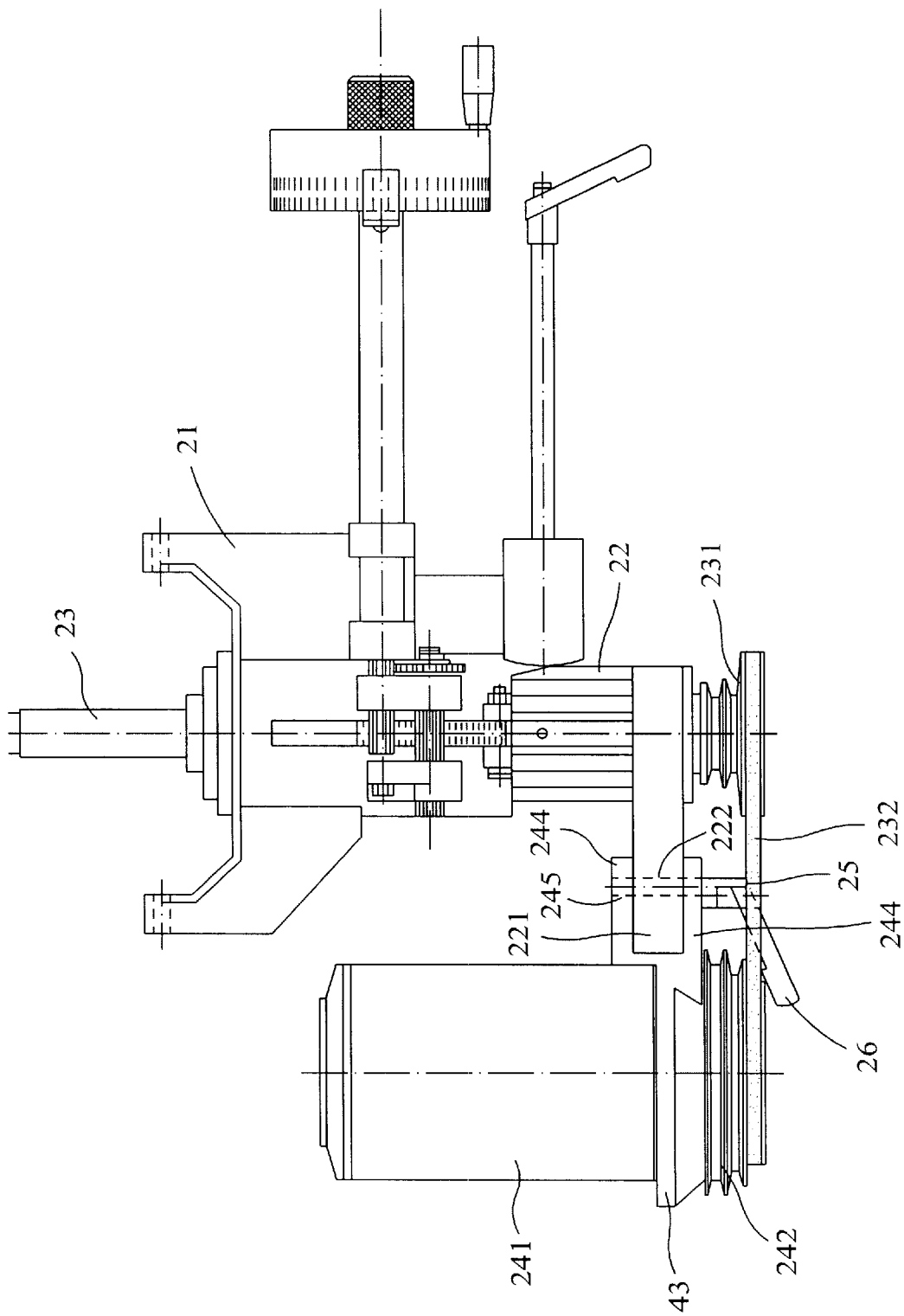
FIG. 2 is a front view of the present invention.
Figure 3:
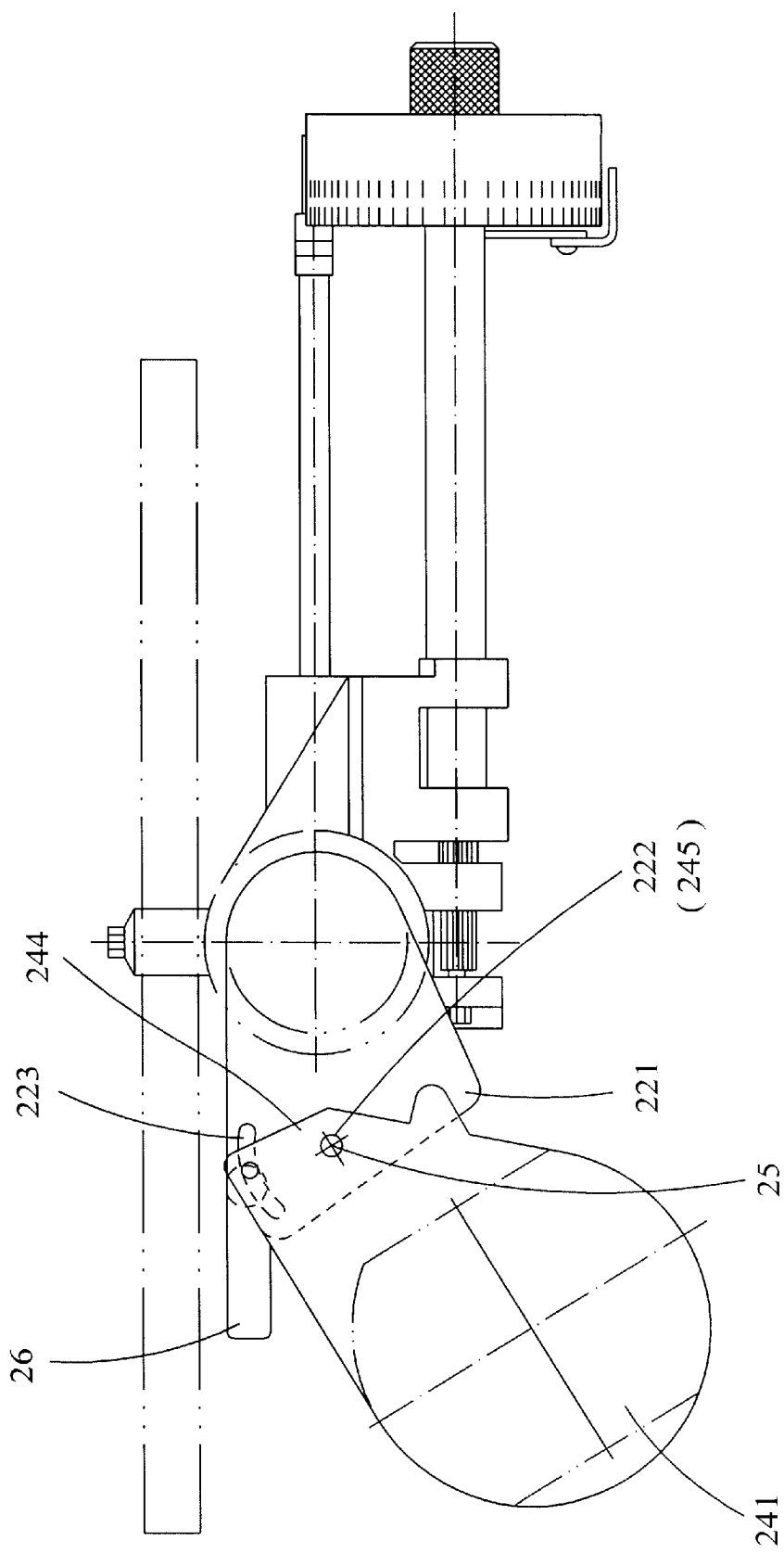
FIG. 3 is a top view of the present invention.
Figure 4:
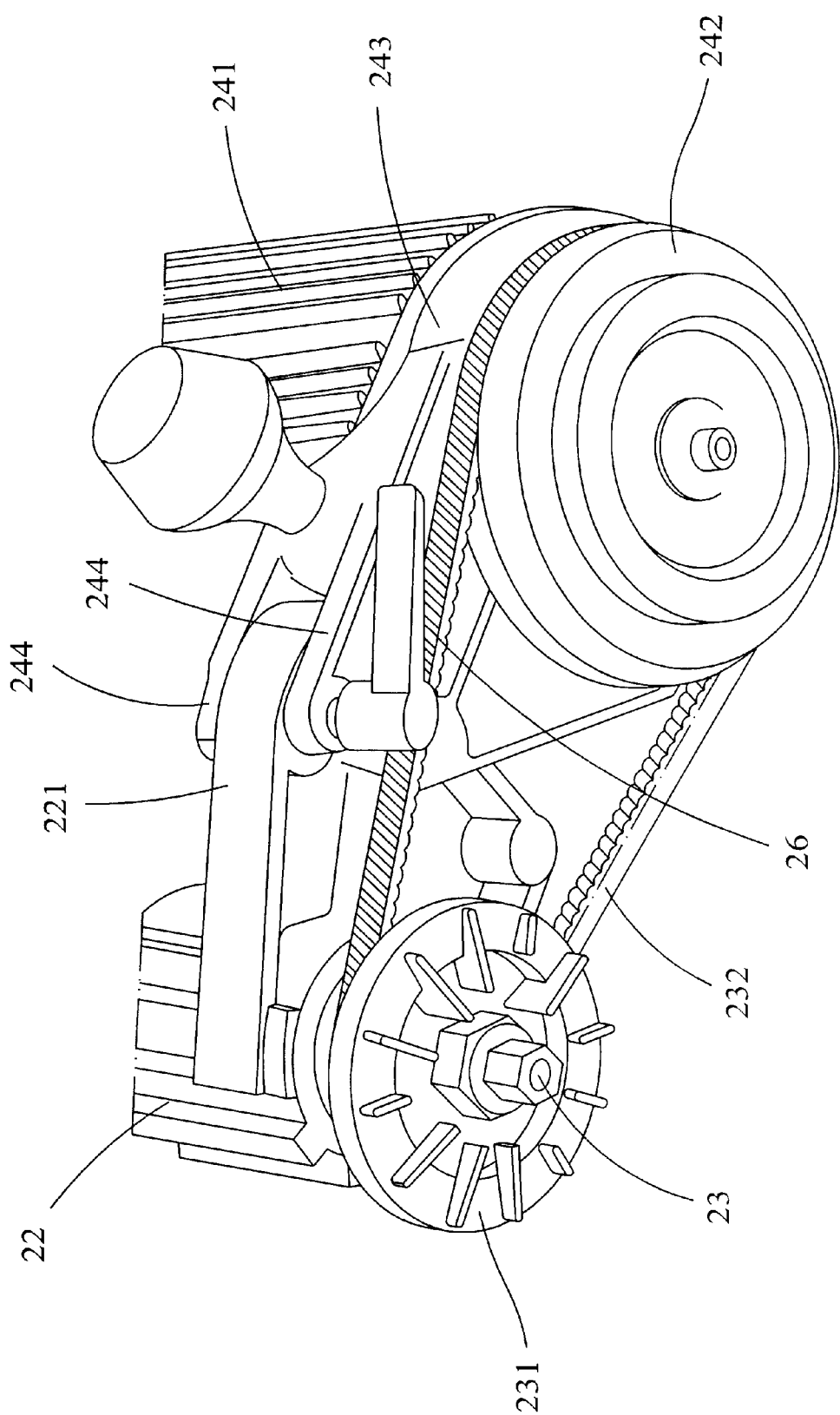
FIG. 4 is a perspective view of the present invention.

With reference to the drawings and in particular to FIGS. 2, 3 and 4 thereof, the present invention comprises a base 21 which is hollow in structure. An elevating axle casing 22 is fitted in the base 21 and provided with a spindle 23 for connecting with a planing cutter (not shown). A pulley 231 is arranged under the spindle 23 so that a belt 232 can connect the pulley 231 with a pulley 242 of a motor 241. The structure between the axle casing 22 and the spindle 23 may be of any conventional design well known to those skilled in the art and is not considered a part of the invention. The present invention is characterized as follows:

The axle casing 22 is provided at the bottom with an extension 221 having a circular hole 222 and a curved groove 223 subtending the center of the circular hole 222.

A motor cover 243 is installed on one end of the motor 241 and has a pair of lugs 244 in which is fitted an end of the extension 221 of the axle casing 22. A pin 25 is inserted into the lugs 244 of the motor cover 243 and the circular hole 222 of the extension 221 of the axle casing 22 thus forming a pivot therebetween. A locking handle 26 is threadedly engaged with one of the lugs 244 so that the motor 241 can be fastened on one side of the axle casing 22.

Figure 5:
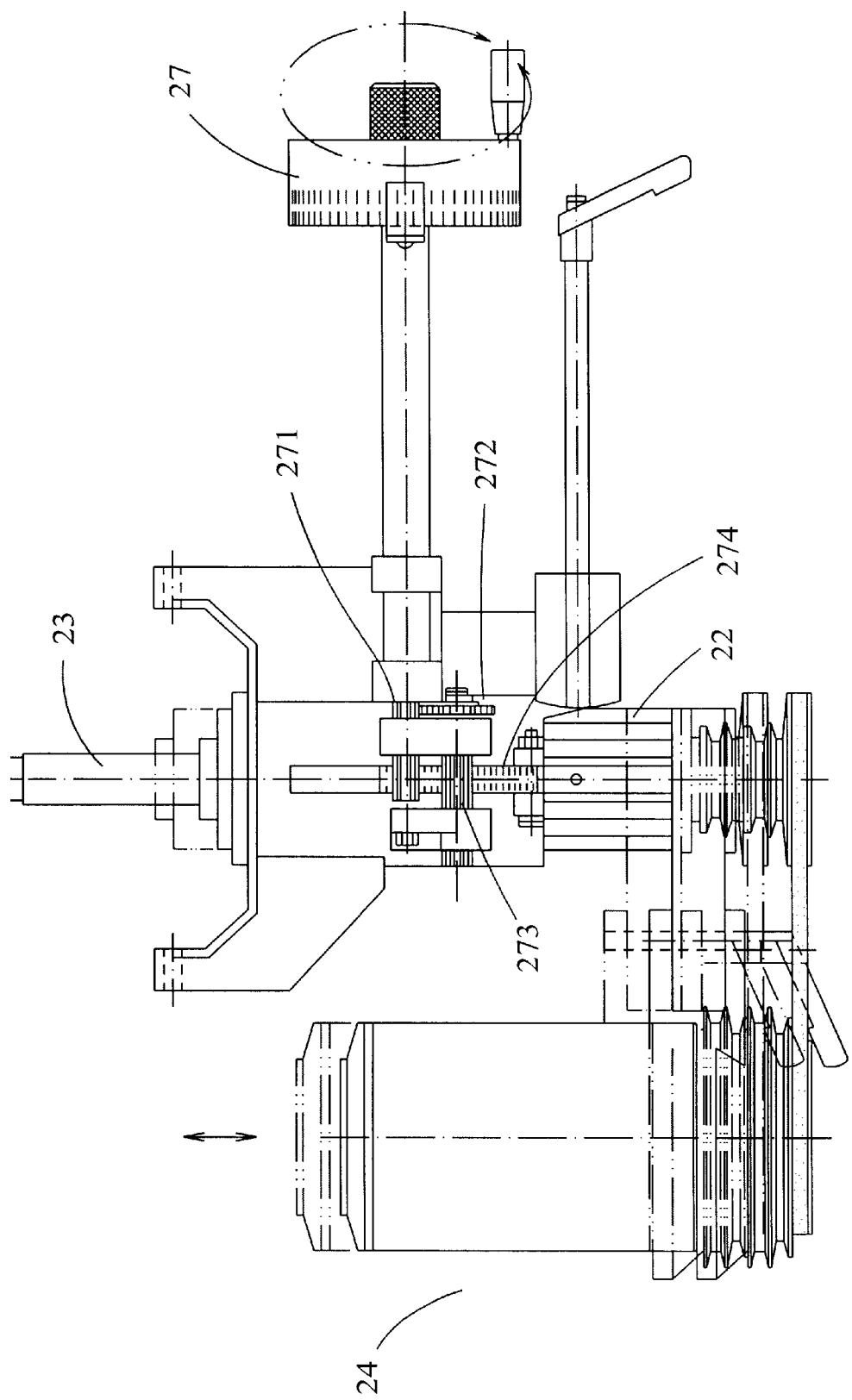
FIG. 5 illustrates the elevation adjustment of the present invention.
Figure 6:
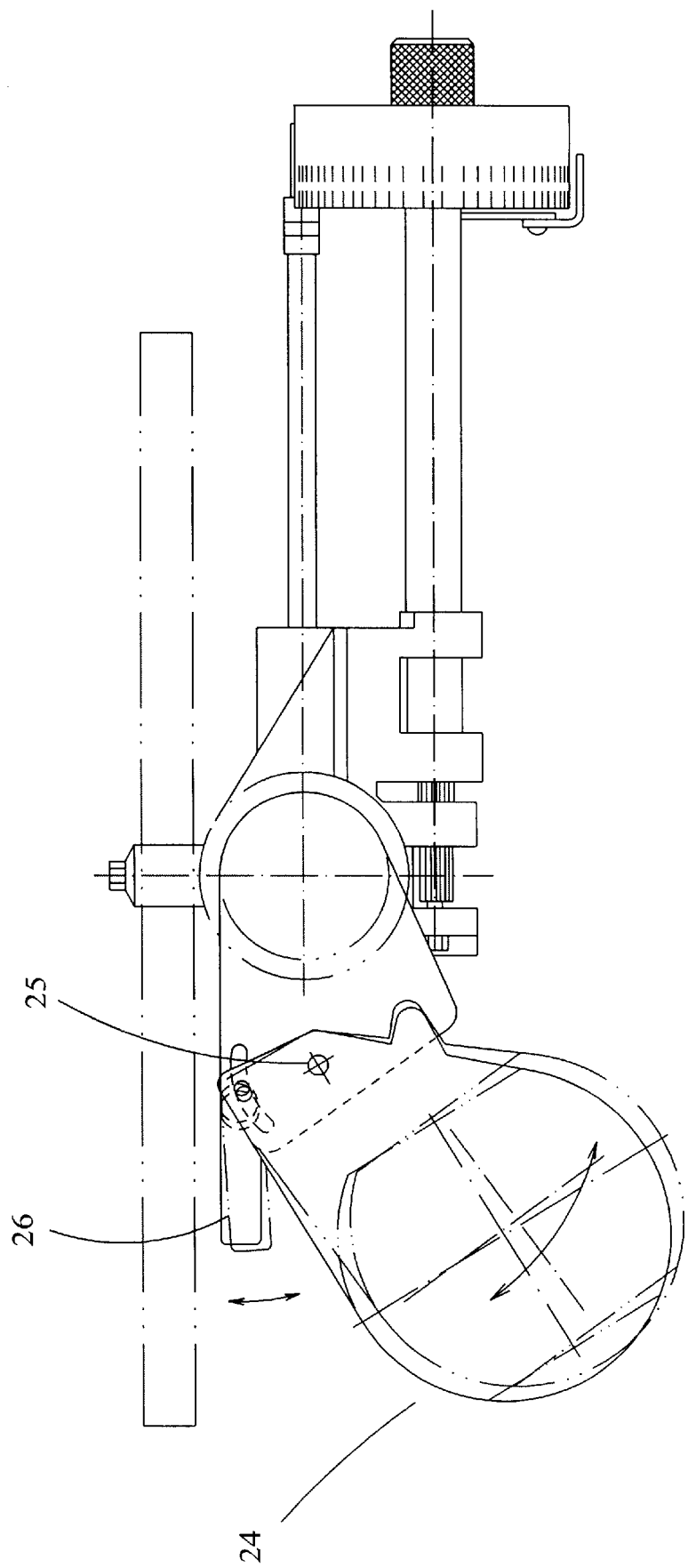
FIG. 6 illustrates how to move the motor assembly to adjust the tension of the belt.

The working principle of the present invention will now be described as follows:

Referring to FIG. 5, when the handwheel 27 is rotated, the pinion 271 will drive the gears 272 and 273 which will in turn rotate the rack 274 fastened on the axle casing 22 thereby enabling the axle housing 22, the spindle 23 and the motor assembly 24 to move up and down as required.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure for mounting a motor of a planing machine comprising:

a hollow base;

an axle casing fitted in said base and provided with a spindle for connecting with a planing cutter;

a first pulley arranged under said spindle so that a belt connects said first pulley with a second pulley of a motor;

wherein said axle casing is provided at a bottom with an extension having a circular hole and a curved groove subtending the center of the circular hole, a motor cover is installed on one end of a motor and has a pair of lugs in which is fitted an end of said extension, a pin is inserted into said lugs and said circular hole to form a pivot therebetween, and a locking handle is threadedly engaged with one of said lugs so that said motor is fastened on one side of said axle casing.

* * * * *